United States Patent [19]
Lahti et al.

[11] Patent Number: 5,895,469
[45] Date of Patent: *Apr. 20, 1999

[54] SYSTEM FOR REDUCING ACCESS TIMES FOR RETRIEVING AUDIO SAMPLES AND METHOD THEREFOR

[75] Inventors: Gregg D. Lahti, Chandler; Gary D. Hicok, Mesa; Scott E. Harrow, Scottsdale, all of Ariz.

[73] Assignee: VLSI Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/613,148

[22] Filed: Mar. 8, 1996

[51] Int. Cl.$^6$ ............................................. G06F 13/00
[52] U.S. Cl. ................................ 395/872; 395/873; 395/855
[58] Field of Search ............................ 84/603, 629; 381/63; 395/200.49, 872, 873, 855; 369/124; 348/7; 711/136, 113, 127

[56] References Cited

U.S. PATENT DOCUMENTS

| | | | |
|---|---|---|---|
| 4,636,946 | 1/1987 | Hartung et al. | 711/136 |
| 5,111,727 | 5/1992 | Rossum | 84/603 |
| 5,342,990 | 8/1994 | Rossum | 84/603 |
| 5,530,762 | 6/1996 | Jones, Jr. et al. | 381/63 |
| 5,574,662 | 11/1996 | Windrem et al. | 395/200.49 |
| 5,584,007 | 12/1996 | Ballard | 711/113 |
| 5,590,112 | 12/1996 | Morishima | 369/124 |
| 5,614,940 | 3/1997 | Cobbley et al. | 348/7 |
| 5,668,338 | 9/1997 | Hewitt et al. | 84/629 |
| 5,761,713 | 6/1998 | Lesartre | 711/127 |

FOREIGN PATENT DOCUMENTS 7-325582  12/1995  Japan .

OTHER PUBLICATIONS

Steven Morton, "A236 Parallel DSP Chip Provides Real-time Video Processing Economically and Efficiently", IEEE, pp. 261-268, 1996.

*Primary Examiner*—Wayne Amsbury
*Assistant Examiner*—Thuy Pardo
*Attorney, Agent, or Firm*—Harry M. Weiss; Jeffrey D. Moy; Harry M. Weiss & Associates, P. C.

[57] ABSTRACT

The present invention relates to a system and a method for reducing access times for retrieving audio samples. The system uses a wave table cache. The wave table cache allows devices such as a Digital Signal Processor (DSP) to retrieve audio samples in a linear fashion from the wave table cache at a rate much faster than individually fetching the required portions of the audio sample from the main memory of the system. The DSP may then use the audio samples to generate signals to create sounds based on the audio samples.

11 Claims, 1 Drawing Sheet

5,895,469

SYSTEM FOR REDUCING ACCESS TIMES FOR RETRIEVING AUDIO SAMPLES AND METHOD THEREFOR

RELATED APPLICATIONS

This application is related to the applications entitled "A SYSTEM AND METHOD FOR THE DECOMPRESSION AND RECONSTRUCTION OF WAVE TABLE AUDIO SAMPLES", Ser. No. 08/613,151, now pending, and "A METHOD FOR STORING AND TRANSFERRING WAVE TABLE AUDIO SAMPLES", Ser. No. 08/613,261, now U.S. Pat. No. 5,813,027, filed concurrently herewith, in the name of the same inventors, and assigned to the same assignee as this Application. The disclosures of the above referenced applications are hereby incorporated by reference into this application.

BACKGROUND OF THE INVENTION

1. Field of the Invention

This invention relates to audio samples and, more specifically, to a system and method for reducing the access time for devices such as a Digital Signal Processor (DSP) to retrieve an audio sample from system memory by using a wave table cache.

2. Description of the Prior Art

Wave tables are used by Digital Signal Processors (DSP) for use in audio applications to create sounds based upon audio samples stored in the system. Storing the audio samples to be used by the DSP may be done in the operating system memory or in a Programmable Read Only Memory (PROM).

The problem with current systems that use the above approach is that system latency to fetch the audio samples from the operating system memory or from a PROM can cause delays in creating the audio sounds and with processing the samples in a timely manner. Furthermore, some computer systems have bandwidth problems across the memory, Input/Output (I/O), or Peripheral Component Interconnect (PCI) busses which can affect the overall performance of the system.

Therefore, a need existed to provide a system and method for retrieving and processing the audio samples in a timely manner without causing delays in the system. The system and method must also reduce bandwidth problems across the memory, I/O, and PCI busses thereby increasing the overall performance of the system.

SUMMARY OF THE INVENTION

In accordance with one embodiment of the present invention, it is an object of the present invention to provide a system and method for reducing the amount of time it takes for devices such as a DSP to retrieve and process an audio sample.

It is another object of the present invention to provide a system and method for reducing bandwidth problems across the memory, I/O, and PCI busses.

BRIEF DESCRIPTION OF THE PREFERRED EMBODIMENTS

In accordance with one embodiment of the present invention, a system for decreasing access times for retrieval of audio samples is disclosed. The system is comprised of means for creating sounds based upon audio samples stored in the system. The means for creating sounds is generally a digital signal processor. The digital signal processor will generate signals based on requested audio samples and will convert the signals into sounds based on the requested audio signals. System memory means are coupled to the means for generating sounds for storing the audio samples. The system memory means may be the operating system memory or a Programmable Read Only Memory (PROM). Cache means are coupled to the means for generating sounds and the system memory means for providing a wave table cache for transferring requested audio samples stored in the cache means in a linear fashion to the means for generating sounds. The cache means is generally a dual ported cache memory having one port coupled to the digital signal processor and one port coupled to the system memory means. The dual ported cache memory double buffers audio samples in the cache means thereby allowing the means for generating sounds to read an audio sample from the cache means while another audio sample is being transferred from the system memory means to the cache means. The cache means also allows for the bursting of data across a plurality of busses utilized in the system thereby decreasing request times for the audio samples by the means for generating sounds.

In accordance with another embodiment of the present invention, a method of providing a system for decreasing access times for retrieval of audio samples is disclosed. The method comprises the steps of: providing means for generating sounds based upon the audio samples stored in the system; providing system memory means coupled to the means for generating sounds for storing the audio samples; and providing cache means coupled to the means for generating sounds and the system memory means for providing a wave table cache for transferring requested audio samples in a linear fashion to the means for generating sounds. The method may further include any of the following steps: providing a digital signal processor as the means for generating sounds; providing a Programmable Read Only Memory (PROM) as the system memory means; providing a dual ported cache memory as the cache means having one port coupled to the means for generating sounds and one port coupled to the system memory means, the dual ported cache memory being capable of double buffering audio samples in the cache means allowing the means for creating sounds to read an audio sample from the cache means while another audio sample is being transferred from the system memory to the cache means; and providing cache means which allows for the bursting of data across a plurality of busses utilized in the system thereby decreasing request times for the audio samples by the means for generating sounds.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
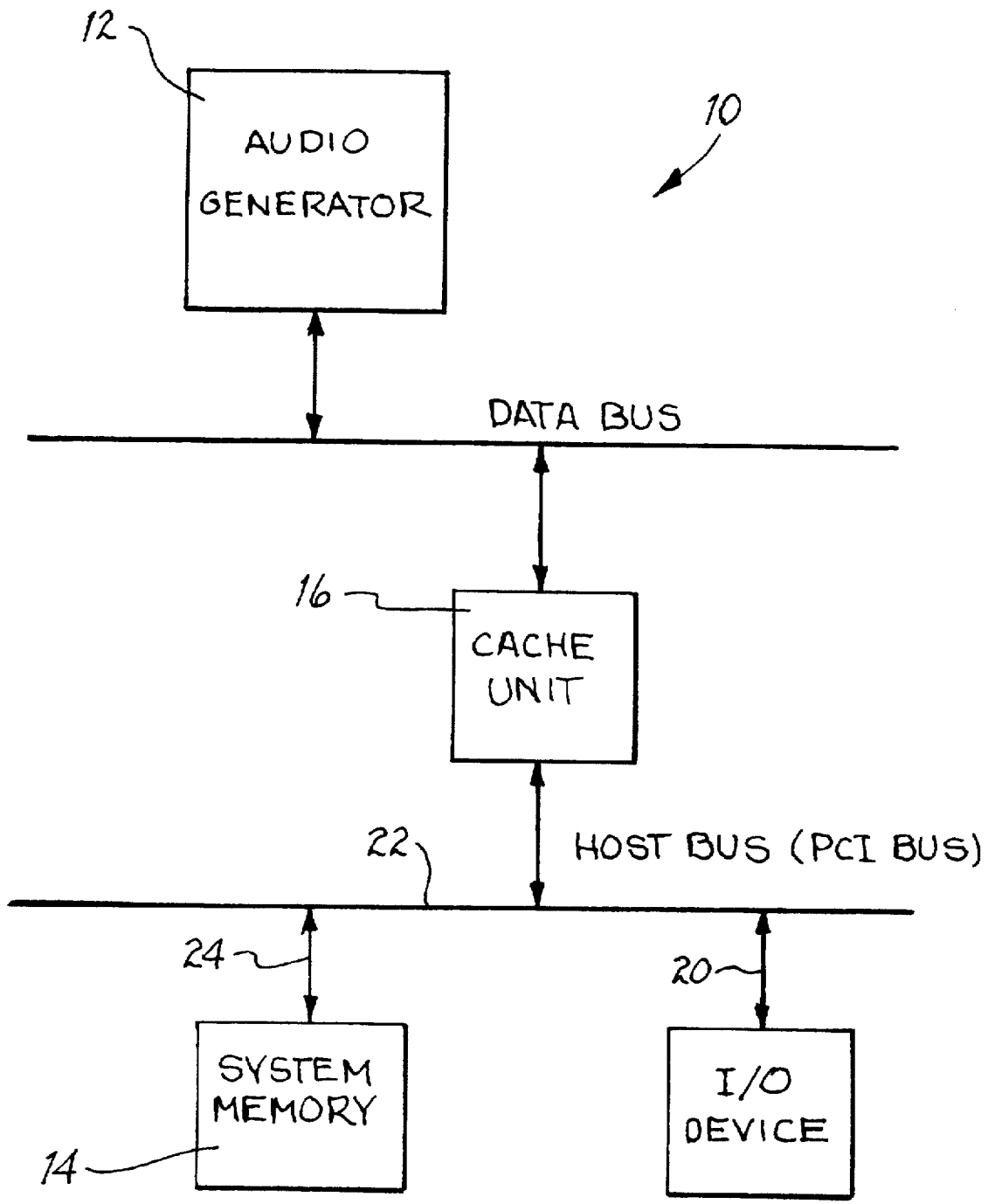
FIG. 1 is a simplified functional block diagram of the wave table cache system of the present invention.

Referring to FIG. 1, a wave table cache system 10 (hereinafter system 10) is shown. The system 10 is used for decreasing access times for the retrieval of audio samples.

The system 10 is comprised of an audio generator 12. The audio generator 12 is used for creating sounds based upon audio samples stored in the system 10. In the preferred embodiment of the present invention, the audio generator 12 is a digital signal processor. The digital signal processor takes the audio sample and converts the sample into signals which are used for creating sounds based on the retrieved audio sample. The audio samples are generally stored in a system memory 14. The system memory may be the operating system memory or a Programmable Read only Memory (PROM).

A cache unit 16 is coupled between the audio generator 12 and the system memory 14. The cache unit 16 is comprised of a plurality of wave tables. The wave tables are used for storing audio samples. When the audio generator 12 requests an audio sample, the system 10 checks the cache unit 16 to determine if the requested audio sample is stored in the cache unit 16. If the audio sample is stored in the cache unit 16, the audio generator 12 will read the audio sample directly from the cache unit 16. If the audio sample is not stored in the cache unit 16, the requested audio sample is transferred from the system memory 14 (or wherever the audio sample is stored) to the cache unit 16. The audio generator 12 then reads the audio sample directly from the cache unit 16. During the transfer of the requested audio sample to the cache unit 16, if the cache unit 16 is full (i.e. all of the wave tables are full of audio samples), the cache unit 16 will utilize a First-In-First-Out (FIFO) like algorithm. The algorithm will discard the least recently used audio sample and fill the newly vacated wave table with the requested audio sample.

By having the requested audio samples stored or transferred to the cache unit 16, the audio generator 12 is able to read the audio samples in a linear fashion at a much faster speed than individually fetching the required portions of the audio sample from the system memory 14. This increases the performance of the system 10 by reducing the amount of time it takes to retrieve the most recently requested audio samples.

The performance of the system 10 is also increased since the cache unit 16 allows for bursting of data across a plurality of busses (I/O bus 20, PCI bus 22, and memory bus 24) utilized in the system 10. The bursting of data allows for faster request times for the audio samples by the audio generator 12, thereby increasing the overall performance of the system 10.

The cache unit 16 also decreases bandwidth problems in the system 10. By having the audio samples stored in the cache unit 16, bandwidth problems across the busses (I/O bus 20, PCI bus 22, and memory bus 24) in the system 10 are reduced since the audio samples are local and do not have to be continuously transferred back and forth between the audio generator 12 and the system memory 14.

In the preferred embodiment of the present invention, the cache unit 16 is a fast access, dual ported cache memory having one port coupled to the audio generator 12 and the other port coupled to the system memory 14. The dual ported cache memory has the ability to double buffer audio samples in the cache unit 16. The ability to double buffer the audio samples in the cache unit 16 increases the overall efficiency of the system 10 by allowing the audio generator 12 to read an audio sample from the cache unit 16 while another audio sample is being transferred from the system memory 14 to the cache unit 16.

While the invention has been particularly shown and described with reference to a preferred embodiment thereof, it should be understood by those skilled in the art that changes in form and detail may be made therein without departing from the spirit and scope of the invention.

What is claimed is:

1. A system for decreasing access times for retrieval of audio samples comprising, in combination:

means for generating sounds based upon said audio samples stored in said system;

system memory means coupled to said means for generating sounds for storing said audio samples; and cache means coupled to said means for generating sounds and said system memory means for providing a wave table cache for transferring requested audio samples stored in said cache means in a linear fashion to said means for generating sounds;

said cache means, when filled to capacity with audio samples and a next requested audio sample is not present within said cache means, implementing an algorithm which discards a least recently used audio sample within said cache means and fills a newly vacated position within said cache means with said next requested audio sample;

said cache means is a dual ported cache memory having one port coupled to said means for generating sounds and one port coupled to said system memory means;

said dual ported cache memory double buffers audio samples in said cache means.

2. A system for decreasing access times for retrieval of audio samples in accordance with claim 1 wherein said means for generating sounds is a digital signal processor means for generating signals based on said requested audio samples stored in said cache means and for converting said signals into sounds based on said requested audio samples.

3. A system for decreasing access times for retrieval of audio samples in accordance with claim 1 wherein said system memory means is a Programmable Read Only Memory (PROM).

4. A system for decreasing access times for retrieval of audio samples in accordance with claim 1 wherein said dual ported cache memory double buffers audio samples in said cache means allowing said means for generating sounds to read an audio sample from said cache means while another audio sample is being transferred from said system memory means to said cache means.

5. A system for decreasing access times for retrieval of audio samples in accordance with claim 1 wherein said cache means allows for bursting of data across a plurality of busses utilized in said system thereby allowing faster request times for said audio samples stored in said system.

6. A system for decreasing access times for retrieval of audio samples comprising, in combination:

digital signal processor means for generating signals based on said audio samples stored in said system and for converting said signals into sounds based on said audio samples;

system memory means coupled to said digital signal processor means for storing said sound samples; and dual ported cache memory means having one port coupled to said digital signal processor means and one port coupled to said system memory means for providing a wave table cache for transferring requested audio samples stored in said dual ported cache memory means in a linear fashion to said digital signal processor means, for double buffering audio samples in said dual ported cache memory means allowing said digital signal processor means to read an audio sample from said dual ported cache memory means while another audio sample is being transferred from said system memory means to said dual ported cache memory means, and for allowing bursting of data across a plurality of busses utilized in said system thereby allowing faster request times for said audio samples requested by said digital signal processor means;

said dual ported cache memory means, when filled to capacity with audio samples and a next requested audio sample is not present within said dual ported cache memory means, implementing an algorithm which discards a least recently used audio sample within said dual ported cache memory means and fills a newly vacated position within said dual ported cache memory means with said next requested audio sample.

7. A method of providing a system for decreasing access times for retrieval of audio samples comprising the steps of:

providing means for generating sounds based upon said audio samples stored in said system;

providing system memory means coupled to said means for generating sounds for storing said audio samples; and providing cache means coupled to said means for generating sounds and said system memory means for providing a wave table cache for transferring requested audio samples in a linear fashion to said means for generating sounds;

said cache means, when filled to capacity with audio samples and a next requested audio sample is not present within said cache means, implementing an algorithm which discards a least recently used audio sample within said cache means and fills a newly vacated position within said cache means with said next requested audio sample;

said cache means is a dual ported cache memory having one port coupled to said means for generating sounds and one port coupled to said system memory means;

said dual ported cache memory double buffers audio samples in said cache means.

8. The method of claim 7 wherein said step of providing system memory means further comprises the step of providing a Programmable Read Only Memory (PROM) as said system memory means.

9. The method of claim 7 wherein said dual ported cache memory double buffers audio samples in said cache means allowing said means for generating sounds to read an audio sample from said cache means while another audio sample is being transferred from said system memory to said cache means.

10. The method of claim 7 wherein said step of providing cache means further comprises the step of providing cache means which allows for bursting of data across a plurality of busses utilized in said system thereby allowing faster request times for said audio samples by said means for generating sounds.

11. The method of claim 7 wherein said step of providing means for generating sounds based upon said audio samples stored in said system further comprises the step of providing a digital signal processor means for generating signals based on said audio samples stored in said system and for converting said signals into sounds based on said audio samples.

* * * * *